April 12, 1955  A. F. HICKMAN  2,706,113
SPRING SUSPENSION FOR VEHICLES
Filed Jan. 26, 1951  3 Sheets-Sheet 1

INVENTOR.
Albert F. Hickman
BY
Popp and Sommer
Attorneys.

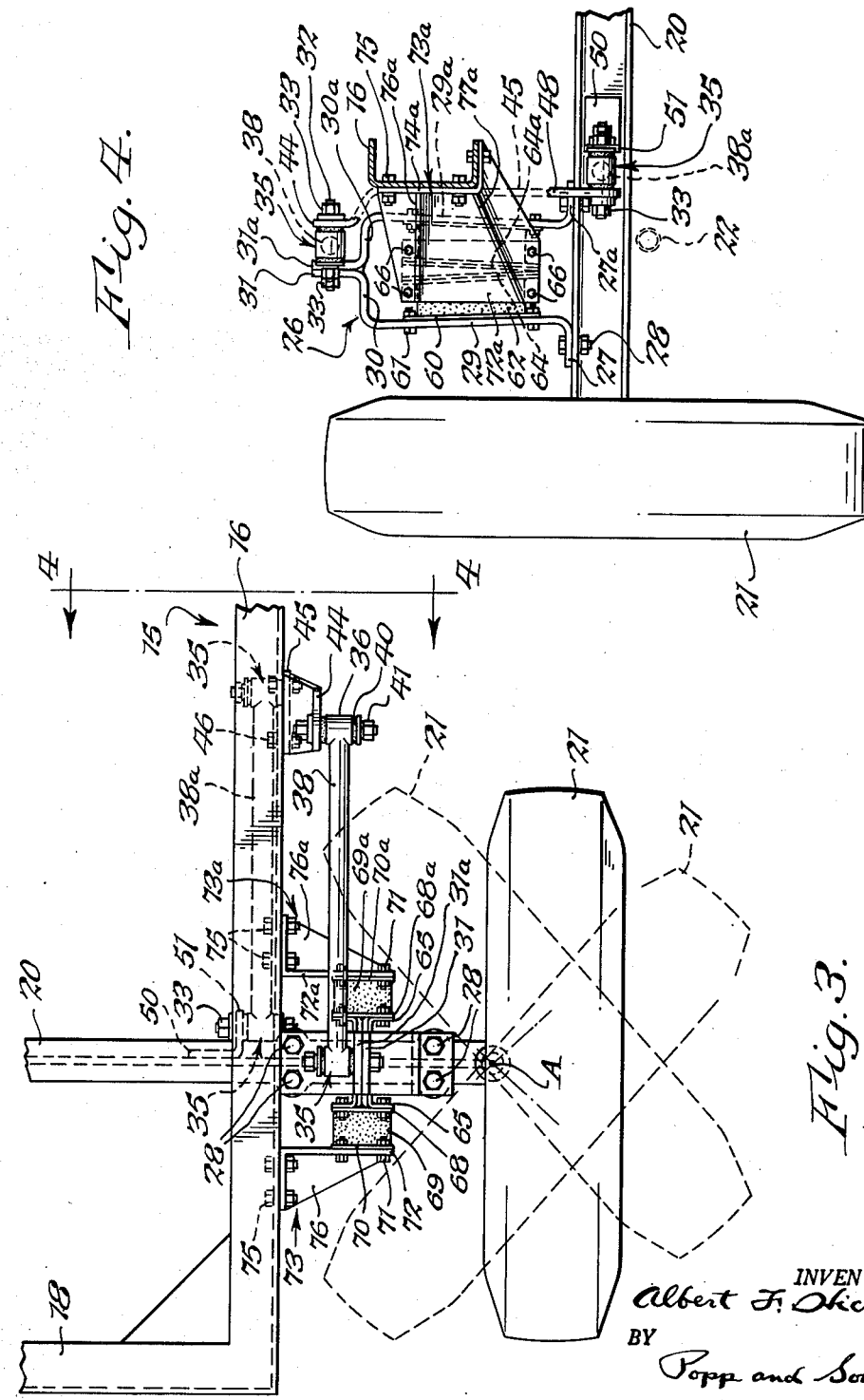

April 12, 1955  A. F. HICKMAN  2,706,113
SPRING SUSPENSION FOR VEHICLES
Filed Jan. 26, 1951  3 Sheets-Sheet 3
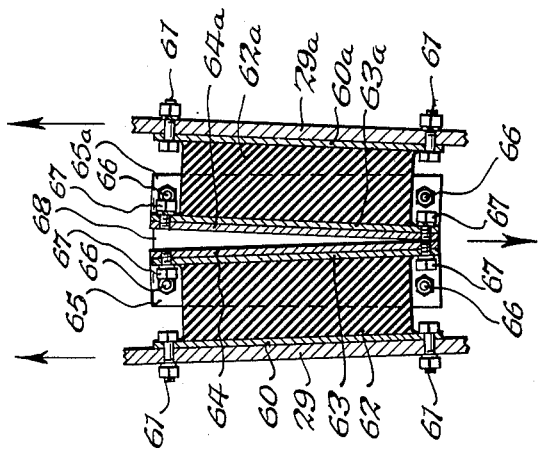
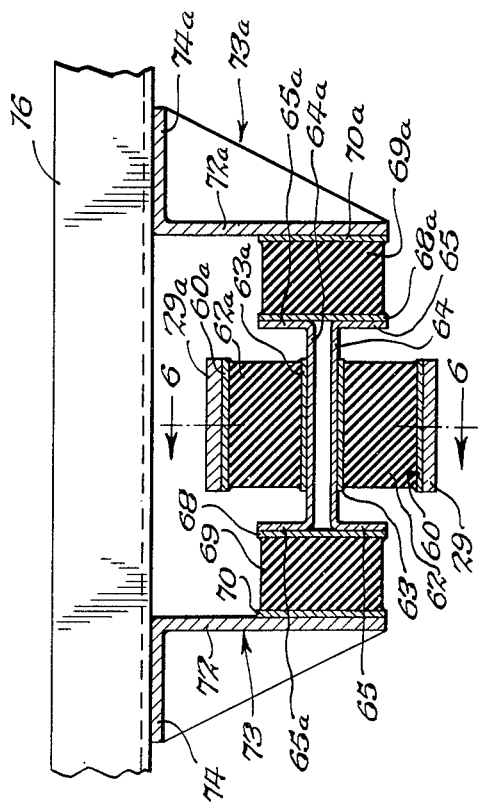
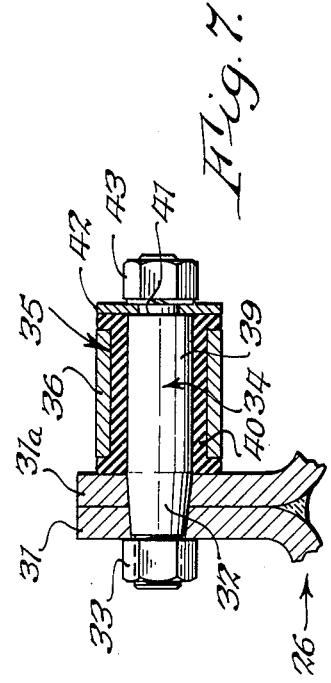
INVENTOR.
Albert F. Hickman
BY
Popp and Sommer
Attorneys.

United States Patent Office 2,706,113
Patented Apr. 12, 1955

2,706,113

SPRING SUSPENSION FOR VEHICLES

Albert F. Hickman, Eden, N. Y., assignor to Hickman Developments, Inc., Eden, N. Y., a corporation of New York Application January 26, 1951, Serial No. 207,999

15 Claims. (Cl. 267—21)

This invention relates to a vehicle spring suspension of the shear rubber, rectilinear movement type and is more particularly shown as embodied in a suspension between a highway vehicle frame and the front steering axle thereof although features of the invention can also be used in suspensions between the frame and the rear driving axle thereof as illustrated in my companion application for Spring Suspension for Vehicles, Serial No. 213,194, filed February 28, 1951, and can also be used in suspensions between the frame and tandem axles as illustrated in my companion application for Tandem Axle Vehicle Spring Suspension, Serial No. 260,462, filed December 7, 1951, now Patent No. 2,663,570, dated December 22, 1953.

One of the important objects of the present invention is to provide a shear rubber, rectilinear movement type of spring suspension which will permit the large amount of vertical axle movement necessary with highway vehicles to provide a vertical ride as soft as load heights will allow and at a low frequency, in the order of from 85 to 105 cycles per minute, at the front end of conventional trucks and in the order of from 105 to 110 cycles per minute at the rear end of conventional trucks, even when empty.

Another important object is to provide such a suspension in which lateral, vertical angular and a slight amount of longitudinal axle movement, with reference to the vehicle frame, are permitted and resiliently resisted, the lateral and angular resiliency being sufficient to absorb the lateral thrust of the axle, particularly resulting from one wheel moving up and down, thereby to provide increased safety, tire and gasoline mileage and stability, and the longitudinal resiliency being sufficient to eliminate detrimental vibrations due to rigidity of the axle lengthwise of the frame. The elimination of axle rigidity vertically, longitudinally and angularly with reference to the vehicle frame is requisite for maximum life of the frame, suspension, axle and tires as well as for maximum in stability and safety, and maximum economies in power and preservation of the cargo.

Another object is, in single axle application, the complete elimination of lubrication as well as the lubricant seals and the servicing incidental to parts requiring lubrication.

Another most important object of the invention is to provide, for the front or steering axle, such a suspension which permits the front or steering wheels to be turned or steered by turning the steering wheel, but which substantially prevents any lateral turning or steering movement of the steering wheels as a consequence of the vertical, lateral, angular or longitudinal movement of the front axle with reference to the vehicle frame.

Another object is to provide such a suspension which will stand up without any servicing, repair or replacement, barring accident, for many years of service even under conditions of severe and constant use.

Another object is to provide such a suspension in which the frame is cradled and supported at well spaced points so as to reduce frame stresses.

Another object is to provide such a suspension which is very light in weight, particularly in unsprung weight, as compared with conventional suspensions.

Another object is to provide such a suspension which is free from friction but can be automatically controlled by an increasing resistance to motion in proportion to amplitude and velocity of vertical frame and wheel movements.

Another object is to provide such a suspension in which very little shock absorber control is required.

Another object is to provide such a suspension consisting of compact units which can be arranged between each wheel and the frame without interference with vertical, lateral and vertical angular axle movement with respect to the frame and, with the front steering axle, permitting full steering movement of the wheels in making short turns.

Another object is to provide a front or steering axle suspension which provides a much wider spring base than that provided with conventional leaf springs.

Another object is to provide such a suspension which can be easily taken down and replaced.

Another most important object is to provide such a suspension which is low in cost, both as to initial cost and also upkeep, particularly as compared with conventional spring suspensions.

Another object is to provide such a suspension which renders auxiliary devices for control of sidesway, such as torsion bar stabilizers, unnecessary.

Another object is to provide such a suspension in which periodic vibration of the suspension is dampened out and in which wheel tramp is avoided.

Another object is to provide a suspension which can be designed to have a long and variable spring resistance range.

Another object is to provide such a suspension employing rubber blocks or bodies in rectilinear shear and in which the bond stress of the rubber is kept within safe working limits.

Other objects and advantages of the invention will appear from the following description and drawings in which:

Fig. 3 is an enlarged fragmentary top plan view similar to Fig. 1 and showing the parts in greater detail.

Fig. 4 is an enlarged vertical section taken on line 4—4, Fig. 3.

Fig. 5 is a fragmentary horizontal section taken on line 5—5, Fig. 2.

Fig. 6 is a fragmentary vertical section taken on line 6—6, Fig. 5.

Fig. 7 is a fragmentary vertical section through one of the four identical rubber bushed bearings for the two links or radius rods provided at each side of the vehicle, the section being taken on line 7—7, Fig. 2.

Figure 2:
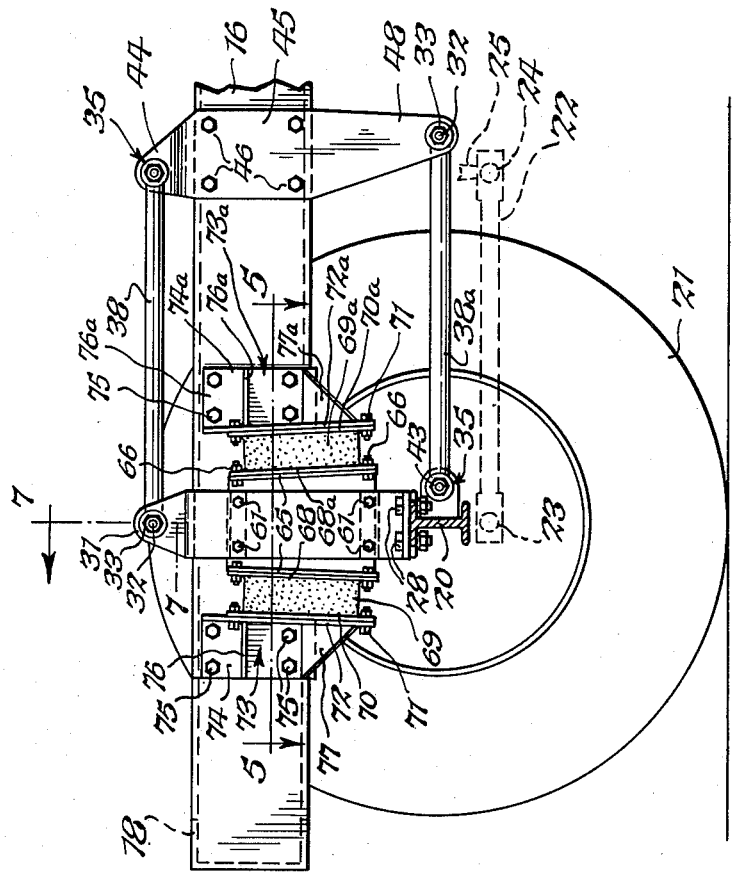
Fig. 2 is an enlarged fragmentary side elevational view thereof.
Figure 1:
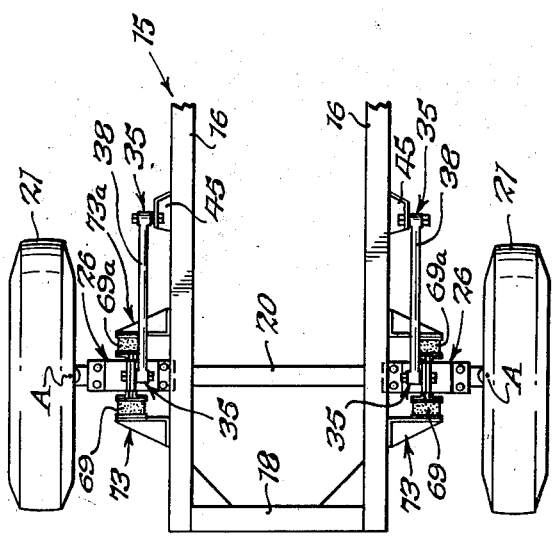
Fig. 1 is a fragmentary top plan view of the front end of a vehicle frame supported on a front steering axle and steering wheels by a spring suspension embodying my invention.

The main frame 15 of the vehicle can be of any suitable construction and is shown as comprising a pair of longitudinal horizontal side frame bars in the form of inwardly facing channels 16, which are shown as straight and parallel and as connected by cross bars 18. The entire vehicle chassis, together with its spring suspension, is constructed substantially symmetrically about a vertical longitudinal medial plane, and hence it is deemed sufficient to confine the following detailed description to the one (left) side of the vehicle, it being understood that this description and the same reference numerals apply to the opposite (right) side of the vehicle.

The present invention is directed to the suspension at the front end of the vehicle and which is supported on a front steering axle 20 in the form of an I-beam extending transversely of the frame 15. Each end of this axle is supported by a front steering wheel 21 which is supported on the axle and moved by any conventional form of steering gear so as to be movable about a generally vertical axis A to the two dotted line positions shown in Fig. 3 for steering the vehicle either to the right or to the left. The specific form of this steering gear is of no consequence so far as the present invention is concerned and the only part of this steering gear which is illustrated is the conventional steering drag link 22, the front end of which is connected by the usual ball and socket joint 23 with the usual actuating arm (not shown) of the stub shaft for the wheel and the rear end of which steering drag link 22 is connected by the usual ball and socket joint 24 to the lower end of the usual actuating arm 25 which is pivoted on the frame for fore-and-aft movement.

Mounted on each end of the steering axle 20 are a pair of counterpart bracket parts which jointly form an inverted U-shaped axle bracket 26 mounted on the axle end and the opening through which extends lengthwise of the vehicle. These counterpart bracket parts of the axle bracket 26 are provided at their lower ends with horizontal attaching flanges 27, 27a which project lengthwise of the axle 20 and are secured to its upper face by bolts 28 or in any other suitable manner. The upstanding sides 29, 29a of these parts of the axle bracket 26 diverge upwardly toward the adjacent wheel 21 and longitudinal side frame bar 16, respectively, and the upper ends of these sides are continued in the form of opposing top connecting portions 30, 30a which terminate in upstanding ears 31, 31a, respectively, these ears being arranged in face-to-face relation.

These ears 31, 31a of each axle bracket 26 are shown as joined together by the tapered and threaded stud 32 and nut 33 of the male part 34 of a rubber bushed universal joint 35, the socket or knuckle 36 of which is formed at the forward end of an upper horizontal link or radius rod 38. While this universal joint 35 can be in the form of a metal ball and socket joint, the male part 34 preferably, as best shown in Fig. 7, has a cylindrical part 39 on which is fitted a cylindrical rubber sleeve 40, this rubber sleeve being axially confined between the ear 31a and a washer 42 secured to the end of the cylindrical part 39 by a nut 43 on a threaded stud projecting axially from the end of the male part 34 opposite the threaded stud 32. The socket or knuckle 36 is in the form of a cylindrical sleeve integral with the front end of the link or radius rod 38 and tightly embracing the rubber sleeve 40 and confined by the ear 31a and washer 42 as best shown in Fig. 7.

The rear end of the upper radius rod or link 38 is secured to the frame through an identical rubber bushed bearing or universal joint 35 and hence the same reference numerals have been employed and the description is not repeated. The tapered threaded stud 32 of this rubber bushed joint at the rear of the upper rod or link 38 is shown as extending through and secured by its nut 33 to this upstanding ear 44 of a frame bracket indicated generally at 45. Each of these frame brackets 45 is shown as secured to the outer face of the corresponding frame side bar 16 by bolts 46 and each is provided with a depending ear 48.

Below each frame side bar 16 the axle 20 is provided with a bracket 50 having a rearwardly extending vertical ear 51 to which the forward end of a lower horizontal radius rod or link 38a is secured by a rubber bushed joint 35 identical with the rubber bushed universal joints previously described, the description and detailed illustration not being repeated. A similar rubber bushed joint 35 connects the rear end of this lower radius rod or link 38a with the depending ear 48 of the axle bracket 45, the same reference numerals being employed as with the other rubber bushed joints 35. These rubber bushed universal joints 35 permit vertical, angular, and lateral movement of the axle 20 with reference to the frame 15 and also permit a limited horizontal movement of the axle 20 lengthwise of the frame 15.

Outer rectangular metal plates 60, 60a are respectively secured by four corner bolts 61 to the opposing upwardly diverging faces of the upright sides 29, 29a of each axle bracket 26. To the opposing faces of each of these plates 60, 60a are vulcanized, respectively, a body 62, 62a of rubber, the opposing faces of these bodies 62, 62a of rubber having vulcanized thereto rectangular inner metal plates 63, 63a, respectively. The rectangular inner metal plates 63, 63a are parallel with the companion outer rectangular metal plates 60, 60a and since the upright sides 29, 29a of each axle bracket 25 diverge upwardly, it will be seen that the inner plates 63, 63a diverge upwardly relative to each other. Each of these inner rectangular metal plates 63, 63a is, respectively secured to the outer face of a channel plate 64, 64a, as by cap screws 67, these channel plates having front and rear flanges 65, 65a, along their front and rear edges. The flanges 65 project toward the adjacent wheel 21 and the flanges 65a project toward the adjacent frame side bar 16. It will also be noted that these flanges 65, 65 converge upwardly toward each other fore-and-aft of the frame 15 and that similarly the flanges 65a, 65a converge upwardly toward each other to the same degree as the flanges 64, 64. The end edges of these flanges are also preferably vertical and hence it will be seen that these flanges are of upwardly tapering form having less width at the top than at the bottom.

Secured by four corner bolts 66 to the front pair of these upright flanges 65, 65a of each pair of inner channel metal plate 64 is a front inner rectangular metal plate 68. Similarly secured by corner bolts 66 to the rear pair of these upright flanges 65, 65a is a rear rectangular inner metal plate 68a. Since the flanges 65, 65 converge upwardly toward each other to the same degree as the flanges 65a, 65a, it will be seen that the front and rear plates 68 and 68a are disposed in planes which are parallel with the axle 20 but that these plates converge upwardly toward each other.

To the front face of the inner front plate 68 is vulcanized a body 69 of rubber and to the front face of this body of rubber is vulcanized an outer rectangular metal plate 70. Similarly vulcanized to the rear face of the inner rear plate 68a is a body 69a of rubber and to the rear face of this body of rubber is vulcanized a rectangular outer metal plate 70a. The rectangular metal plate 70 is parallel with the companion rectangular metal plate 68 and the rectangular metal plate 70a is parallel with the companion rectangular metal plate 68a and hence it will be seen that these rectangular metal plates converge upwardly relative to each other.

The rectangular outer metal plate 70 is secured by four corner bolts 71 to the flange 72 of a frame bracket 73, this flange projecting outwardly or toward the adjacent wheel 21 from an attaching portion 74 which is secured by four bolts 75 to the outer face of the adjacent frame side bar 16. The flange 72 is shown as reinforced by triangular ribs 76 and 77 connecting it with its attaching portion 74. Similarly the outer rectangular metal plate 70a is secured by four corner bolts 71 to the flange 72a of a frame bracket 73a, this flange projecting outwardly or toward the adjacent wheel 21 from an attaching portion 74a which is secured by four bolts 75 to the outer face of the adjacent frame side bar 16. The flange 72a is shown as reinforced by triangular ribs 76a and 77a connecting it with its attaching portion 74a. The opposing faces of the flanges 72, 72a converge upwardly toward each other parallel with the inner rectangular metal plates 68, 68a, respectively.

In the operation of the suspension, the upward movement of one end of the steering axle 20, through the axle bracket 26, moves the outer plates 60, 60a upwardly. This stresses upwardly the outer or remote portions of the rubber bodies 62, 62a and hence distorting these rubber bodies or blocks upwardly. This upward force impressed upon these rubber bodies 62, 62a is transmitted to the inner plates 63, 63a and, in turn, to the channel plates 64, 64a. Through the flanges 65, 65a of these channel plates this force is transmitted to the inner plates 68, 68a of the second pair of rubber bodies or blocks 69, 69a, these rubber bodies 69, 69a being vulcanized to these plates 68, 68a. This stresses upwardly the inner or adjacent faces of these rubber blocks or bodies 69, 69a. This upward force impressed upon the rubber blocks or bodies 69, 69a is transmitted through the outer or remote plates 70, 70a vulcanized thereto and to the flanges 72, 72a of the two frame brackets 73, 73a and, in turn, to the corresponding side frame bar 16 of the frame.

It will be seen that each of the four rubber bodies 62, 62a, 69, 69a at the end of each axle is stressed upwardly in providing a resilient support for the corresponding frame corner, each of these rubber bodies having a rectilinear shear movement. It will further be seen that the pair of rubber bodies 62, 62a are in series with the pair of rubber bodies 69, 69a thereby to jointly provide the large amount of vertical axle movement necessary with highway vehicles to provide a vertical ride as soft as load heights will allow and at a low frequency, in the order of from 85 to 105 cycles per minute, at the front end of a truck.

A feature of the suspension is that the rubber blocks also provide cushioned lateral and vertical angular axle movement with reference to the vehicle frame. Thus, when the axle 20 is laterally relative to the frame, this force is transmitted through the axle bracket 26 and rubber blocks or bodies 62, 62a to the channel plates 63, 63a. No substantial distortion of these rubber blocks 62, 62a occurs during this movement since under these forces these rubber blocks are merely placed under compression and not under shear. Since these rubber blocks 69, 69a are essentially shear springs they offer great resistance but only slight resiliency to such movement of the axle laterally of the frame. However, this force is transmitted from the channel plates 63, 63a through their flanges 65, 65a to the other pair of rubber blocks or bodies 69, 69a and thence to the frame brackets 73, 73a and the frame 15. Since the rubber bodies 69, 69a are disposed at right angles to the rubber bodies 62, 62a it will be seen that such movement of the axle 20 laterally relative to the frame 15 will impress a horizontal shear force upon the two rubber bodies 69, 69a. These rubber bodies thereby provide resilient resistance to the axle movement by distorting under such shear force.

The disposition of the pair of rubber bodies 62, 62a at right angles to the pair of rubber bodies 69, 69a provides a spring unit in the nature of a universal joint and that hence angular movement of the axle with reference to the vehicle frame is also resiliently resisted. Thus, when one end of the axle 20 rises with reference to the opposite end thereof to provide such angular movement of the axle with reference to the frame, the vertical component of such force is resiliently resisted by all four of the rubber bodies 62, 62a, 69, 69a, and the horizontal component of such angular axle movement is resiliently resisted by the horizontal movement in shear of the rubber bodies 69, 69a.

It will be seen that this suspension at each end of the steering axle comprises two pairs of rubber blocks, the blocks of each pair being arranged in tandem with the blocks of the other pair to provide the required large amplitude of vertical axle movement and to provide a universal joint-like unit which resiliently resists forces applied from all directions.

The pair 62, 62a of rubber blocks is effective to yieldingly resist longitudinal movement of the axle 20 with reference to the vehicle frame. Thus, when the axle 20 moves longitudinally of the frame 15, the rubber blocks 62, 62a are placed in shear and yield whereas the rubber blocks 69, 69a are merely placed under compression and do not contribute much to yieldingly resisting such axle movement. This longitudinal or fore-and-aft movement of the axle 20 with reference to the vehicle frame should be, of course, of very small degree but nevertheless is an important factor in a spring suspension to provide resilient resistance against all forces and to eliminate the transmission of sledge hammer blows from the axle to the frame as would be done if the suspension had complete rigidity as against forces from any direction. This movement of the axle 20 longitudinally or fore-and-aft of the frame is restricted by the horizontal parallelogram links or radius rods 38, 38a which connect the upper and lower ends of the suspension unit at each end of the axle with the frame. Thus, the only movement in this direction permitted by these horizontal links or radius rods 38, 38a in any given angular position relative to the frame is that permitted by the four rubber bushings 40 provided in the universal joints 35 at the opposite ends of these links. The movement of the axle 20 longitudinally of the frame 15 permitted by these rubber bushings 40 is in the order of a small fraction of an inch, this being sufficient, however, to eliminate rigidity of the suspension as against these forces.

In addition to the above described longitudinal flexibility requirement, it is of course obvious that during any extreme arcing or angular movement of the links or radius rods 38, 38a relative to the frame about the axes of the male parts 34 of the rear radius rod pivots, the axle 20 is caused to move longitudinally of the frame to accommodate such arcing of these radius rods. This movement is accommodated principally by the rubber blocks 62, 62a which are in shear and to a much lesser degree by the other two rubber blocks 69, 69a which are under compression.

Since each spring suspension unit, as above described, is in the nature of a universal joint, it is desirable to provide these pairs of links or radius rods 38, 38a to confine the axle substantially to vertical movement with the exception, as previously indicated, of the slight longitudinal movement of the axle relative to the frame permitted by the resilience of the rubber bushings 40 in the pivot or universal joints 35 for these links or radius rods. These links or radius rods 38, 38a which can be light in weight, each pair being of the same length so as to jointly act in the manner of a parallelogram in holding the axle in an upright position. It will also be noted that the drag link 22 of the steering gear is of the same length as these links or radius rods 38, 38a so that no substantial steering of the axles 21 takes place as a consequence of axle movement with reference to the vehicle frame.

Since the rubber blocks or bodies 62, 62a are interposed between the upwardly divergent parallel surfaces of the sides 29, 29a of the axle bracket 26 and the channel plates 64, 64a, it will be seen that upward movement of the axle bracket 26 effects a wedging action on these rubber blocks or bodies 62, 62a. Similarly, since the rubber blocks or bodies 69, 69a are interposed between the upwardly convergent parallel surfaces of the inner rectangular metal plates 68, 68a and the flanges 72, 72a of the frame brackets 73, 73a, it will be seen that upward movement of the axle 20 effects a wedging action on these rubber blocks or bodies 69, 69a. This wedging action for both pairs of rubber bodies increases as the load increases. This wedging action greatly increases the load capacity of the rubber bodies vulcanized to their rectangular metal plates and through which the rubber bodies are secured to the frame brackets and axle bracket. This wedging action also eliminates the cost of an adjusting means between the springs. It also simplifies the mounting problems by the elimination of such adjustment. It also improves the resistance curves of the springs. The resistance is more nearly constant at the start of deflection and increases, through compression of the rubber bodies, as the deflection increases.

It is entirely practicable with the suspension as above described to provide ride frequency of from 85 to 105 cycles per minute on the front end of a conventional truck. This is accomplished with complete freedom of friction of rest, as occurs with leaf springs. Very little shock absorber control is required and in addition to the desirable vertical ride characteristics provided by the suspension, this suspension provides full lateral resiliency as well as resilient resistance to angular axle movement and also movement thereof longitudinally with respect to the frame. Hence, road shocks, regardless of how received by the axle, are cushioned before reaching the frame.

The so-called steering geometry is not affected to any substantial degree by movement of the axle in any direction, this being a most important safety factor. Thus, with the suspension shown, substantially no steering movement of the wheels 21 takes place as a consequence of axle movement. The compactness of each rubber spring unit at each end of the steering axle also permits the unit to be interposed between the frame and the corresponding steering wheel and still not interfere with the movement of the steering wheel in making short turns. Thus, on reference to Fig. 3, it will be seen that the rubber spring unit is compact enough to permit very sharp turning of the corresponding steering wheel, the unit actually being compact enough to enter the tire of the steering wheel.

Lubrication requirements are entirely eliminated in the suspension, and the suspension is so designed to stand up under conditions of severe and constant use, regardless of atmospheric, climatic, road or type of load conditions, at least five years without service. Salt, road dust and weather conditions will not substantially affect the action of the suspension. Oil will slightly affect the rubber springs and shackle bushings, if made of natural rubber, but, only to the extreme outer portions thereof and will not go deep enough to cause any substantial damage within a five year period.

The spring suspension is also very light in weight as compared with conventional spring suspensions, particularly in unsprung weight. With the present trend toward legal load limits, any weight saving in the vehicle is very valuable. However, unsprung weight shaving is almost doubly important. It costs power and loss of load capacity to carry unnecessary weight and its costs at least double in power to carry unnecessary unsprung weight.

By "rubber" as used in the accompanying claims is meant both natural rubber and also synthetic rubber and mixtures of natural and synthetic rubber.

I claim:

1. A vehicle spring suspension adapted to be interposed between the frame structure of a vehicle and an axle structure having a wheel journalled thereon, comprising a apir of rubber bodies each having one generally vertical face secured to one of said structures and arranged generally parallel with said axle structure to be capable of upward flexure and flexure parallel with said axle structure, a second pair of rubber bodies each having one generally vertical face secured to the other of said structures and arranged generally at right angles to said axle structure to be capable of upward flexure and horizontal flexure generally at right angles to said axle structure, and means uniting the faces of said first pair of rubber bodies opposite the said one generally vertical faces to the faces of said second pair of rubber bodies opposite their said one generally vertical faces.

2. A vehicle spring suspension adapted to be interposed between the frame structure of a vehicle and an axle structure having a wheel journalled thereon, comprising a series of generally vertical metal plates including a first outer pair arranged generally parallel with said axle structure, a first inner pair arranged generally parallel with said axle structure in opposing relation to said first outer pair, a second outer pair arranged generally at right angles to said axle structure, and a second inner pair arranged generally at right angles to said axle structure in opposing relation to said second outer pair, a first pair of rubber bodies each uniting the opposing faces of the corresponding plates of said first inner and outer pairs of plates and capable of upward flexure and flexure parallel with said axle structure, a second pair of rubber bodies each uniting the opposing faces of the corresponding plates of said second inner and outer pairs of plates and capable of upward flexure and horizontal flexure generally at right angles to said axle structure, means interconnecting both of said inner pairs of plates, means arranged to connect said first outer pair of plates to one of said structures, and means arranged to connect said second outer pair of plates to the other of said structures.

3. A vehicle spring suspension adapted to be interposed between the frame structure of a vehicle and an axle structure having a wheel journalled thereon, comprising a pair of rubber bodies each having one generally vertical face secured to one of said structures and arranged generally parallel with said axle structure to be capable of upward flexure and flexure parallel with said axle structure, a second pair of rubber bodies each having one generally vertical face secured to the other of said structures and arranged generally at right angles to said axle structure to be capable of upward flexure and horizontal flexure generally at right angles to said axle structure, means uniting the faces of said first pair of rubber bodies opposite their said one generally vertical faces to the faces of said second pair of rubber bodies opposite their said one generally vertical faces, and means interposed between said axle structure and frame structure and restraining movement of said axle structure in the direction of movement of said frame structure.

4. A vehicle spring suspension adapted to be interposed between the frame structure of a vehicle and an axle structure having a wheel journalled thereon, comprising a series of generally vertical metal plates including a first outer pair arranged generally parallel with said axle structure, a first inner pair arranged generally parallel with said axle structure in opposing relation to said first outer pair, a second outer pair arranged generally parallel at right angles to said axle structure, and a second inner pair arranged generally at right angles to said axle structure in opposing relation to said second outer pair, a first pair of rubber bodies each uniting the opposing faces of the corresponding plates of said first inner and outer pairs of plates and capable of upward flexure and flexure parallel with said axle structure, a second pair of rubber bodies each uniting the opposing faces of the corresponding plates of said second inner and outer pairs of plates and capable of upward horizontal flexure and flexure generally at right angles to said axle structure, means interconnecting both of said inner pairs of plates, means arranged to connect said first outer pair of plates to one of said structures, means arranged to connect said second outer pair of plates to the other of said structures, and means interposed between said axle structure and frame structure and yieldingly restraining movement of said axle structure in the direction of movement of said frame structure.

5. A vehicle spring suspension adapted to be interposed between the frame structure of a vehicle and an axle structure having a wheel journalled thereon, comprising a pair of rubber bodies each having one generally vertical face secured to one of said structures and arranged generally parallel with said axle structure to be capable of upward flexure and flexure parallel with said axle structure, a second pair of rubber bodies each having one generally vertical face secured to the other of said structures and arranged generally at right angles to said axle structure to be capable of upward flexure and horizontal flexure generally at right angles to said axle structure, means uniting the faces of said first pair of rubber bodies opposite their said one generally vertical faces to the faces of said second pair of rubber bodies opposite their said one generally vertical faces, and means interposed between said axle structure and frame structure and restraining horizontal movement of said axle structure generally at right angles to said axle structure, comprising a pair of links arranged one above the other and extending generally at right angles to said axle structure, pivot joints connecting the corresponding ends of said links with said axle structure, and pivot joints connecting the opposite ends of said links with said frame structure.

6. A vehicle spring suspension adapted to be interposed between the frame structure of a vehicle and an axle structure having a wheel journalled thereon, comprising a series of generally vertical metal plates including a first outer pair arranged generally parallel with said axle structure, a first inner pair arranged generally parallel with said axle structure in opposing relation to said first outer pair, a second outer pair arranged generally at right angles to said axle structure, and a second inner pair arranged generally at right angles to said axle structure in opposing relation to said second outer pair, a first pair of rubber bodies each uniting the opposing faces of the corresponding plates of said first inner and outer pairs of plates and capable of upward flexure and flexure parallel with said axle structure, a second pair of rubber bodies each uniting the opposing faces of the corresponding plates of said second inner and outer pairs of plates and capable of upward flexure and horizontal flexure generally at right angles to said axle structure, means interconnecting both of said inner pairs of plates, means arranged to connect said first outer pair of plates to one of said structures, means arranged to connect said second outer pair of plates to the other of said structures, and means interposed between said axle structure and frame structure and yieldingly restraining horizontal movement of said axle structure generally at right angles to said axle structure, comprising a pair of links arranged one above the other and extending in the direction of movement of the frame structure, rubber bodies connecting the corresponding ends of said links with one of said structures and pivot joints connecting the opposite ends of said links with the other of said structures.

7. A vehicle spring suspension adapted to be interposed between the frame structure of a vehicle and an axle structure having a wheel journalled thereon, comprising a series of generally vertical metal plates including a first outer pair arranged generally parallel with said axle structure, a first inner pair arranged generally parallel with said axle structure in opposing relation to said first outer pair, a second outer pair arranged generally at right angles to said axle structure, and a second inner pair arranged generally at right angles to said axle structure in opposing relation to said second outer pair, a first pair of rubber bodies each uniting the opposing faces of the corresponding plates of said first inner and outer pairs of plates and capable of upward flexure and flexure parallel with said axle structure, a second pair of rubber bodies each uniting the opposing faces of the corresponding plates of said second inner and outer pairs of plates and capable of upward flexures and horizontal flexure generally at right angles to said axle structure, means interconnecting both of said inner pairs of plates, means arranged to connect said first outer pair of plates to one of said structures, means arranged to connect said second outer pair of plates to the other of said structures, and means interposed between said axle structure and frame structure and yieldingly restraining movement of said axle structure generally at right angles to said axle structure, comprising a pair of links arranged one above the other and extending in the direction of movement of the frame structure, rubber bodies connecting the corresponding ends of said links with said axle structure, and rubber bodies connecting the opposite ends of said links with said frame structure.

8. A vehicle spring suspension adapted to be interposed between the frame of a highway vehicle and an axle having a wheel journalled thereon, comprising a series of metal plates including a first outer pair arranged in opposing upwardly converging relation to each other and generally parallel with said axle, means arranged to secure said first outer pair of plates to said frame, a second inner pair of plates arranged between and in generally parallel, opposing relation to said first outer pair of plates, a second outer pair of plates arranged in opposed upwardly diverging relation to each other and generally at right angles to said axle, and a second inner pair of plates arranged between and in generally parallel opposing relation to said second outer pair of plates, means arranged to connect said second outer pair of plates to said axle, a first pair of rubber bodies each uniting the opposing faces of the corresponding plates of said first inner and outer pairs of plates and capable of upward flexure and flexure parallel with said axle, a second pair of rubber bodies each uniting the opposing faces of the corresponding plates of said second inner and outer pairs of plates and capable of upward flexure and horizontal flexure generally at right angles to said axle, and means arranged to interconnect both of said inner pairs of plates.

9. A vehicle spring suspension adapted to be interposed between the frame of a highway vehicle having a longitudinal side bar and an axle having a wheel journalled thereon, comprising a pair of frame brackets secured to said side frame bar on opposite sides of said axle and each having a generally vertical face arranged generally parallel with said axle and said generally vertical faces opposing each other, a first pair of rubber blocks each having opposite generally vertical faces, means uniting one of said generally vertical faces of each of said rubber blocks to the said generally vertical face of the corresponding frame bracket, a first pair of generally vertical plates arranged generally parallel with said axle, means uniting the corresponding faces of said first pair of plates with the corresponding faces of said first pair of rubber blocks opposite their said generally vertical faces, a second pair of generally vertical plates arranged generally at right angles to said axle, means arranged to connect said first and second pairs of generally vertical plates, a second pair of rubber blocks each having opposing generally vertical faces, means uniting one of said generally vertical faces of each of said second pair of rubber blocks to the said corresponding face of said second pair of generally vertical plates, and means connecting the face of each of said second pair of rubber blocks opposite said opposing generally vertical faces thereof with said axle.

10. A vehicle spring suspension adapted to be interposed between the frame of a highway vehicle having a longitudinal side bar and an axle having a wheel journalled thereon, comprising a pair of frame brackets secured to said side frame bar on opposite sides of said axle and each having a generally vertical face arranged generally parallel with said axle and said generally vertical faces opposing each other, a first pair of rubber blocks each having opposite generally vertical faces, means uniting one of said generally vertical faces of each of said rubber blocks to the said generally vertical face of the corresponding frame bracket, a first pair of generally vertical plates arranged generally parallel with said axle, means uniting the corresponding faces of said first pair of plates with the corresponding faces of said first pair of rubber blocks opposite their said generally vertical faces, a second pair of generally vertical plates arranged generally at right angles to said axle, means arranged to connect said first and second pairs of generally vertical plates, a second pair of rubber blocks each having opposing generally vertical faces, means uniting one of said generally vertical faces of each of said second pair of rubber blocks to the said corresponding face of said second pair of generally vertical plates, and means connecting the face of each of said second pair of rubber blocks opposite said opposing generally vertical faces thereof with said axle, comprising an inverted U-shaped axle bracket having an upper connecting portion and depending legs straddling said second pair of rubber blocks, means arranged to secure said legs to said axle, and means arranged to secure said legs to said faces of said second pair of rubber blocks opposite said opposing generally vertical faces thereof.

11. A vehicle spring suspension adapted to be interposed between the frame of a highway vehicle having a longitudinal side bar and an axle having a wheel journalled thereon, comprising a pair of frame brackets secured to said side frame bar on opposite sides of said axle and each having a generally vertical face arranged generally parallel with said axle and said generally vertical faces opposing each other, a first pair of rubber blocks each having opposite generally vertical faces, means uniting one of said generally vertical faces of each of said rubber blocks to the said generally vertical face of the corresponding frame bracket, a first pair of generally vertical plates arranged generally parallel with said axle, means uniting the corresponding faces of said first pair of plates with the corresponding faces of said first pair of rubber blocks opposite their said generally vertical faces, a second pair of generally vertical plates arranged generally at right angles to said axle, means arranged to connect said first and second pairs of generally vertical plates, a second pair of rubber blocks each having opposing generally vertical faces, means uniting one of said generally vertical faces of each of said second pair of rubber blocks to the said corresponding face of said second pair of generally vertical plates, means connecting the face of each of said second pair of rubber blocks opposite said opposing generally vertical faces thereof with said axle, comprising an inverted U-shaped axle bracket having an upper connecting portion and depending legs straddling said second pair of rubber blocks, means arranged to secure said legs to said axle, and means arranged to secure said legs to said faces of said second pair of rubber blocks opposite said opposing generally vertical faces thereof, and means restraining said axle against horizontal movement generally at right angles to said axle, comprising an upper link pivoted at one end to said frame to extend generally at right angles to said axle, means pivotally connecting the other end of said link to said upper connecting portion of said axle upper bracket, a lower link below and parallel with said upper link, and means pivotally connecting the opposite ends of said lower link to said axle and frame, respectively.

12. A vehicle spring suspension adapted to be interposed between the frame of a highway vehicle having a longitudinal side bar and an axle having a wheel journalled thereon, comprising a pair of frame brackets secured to said side frame bar on opposite sides of said axle and each having a generally vertical face arranged generally parallel with said axle and said generally vertical faces opposing each other, a first pair of rubber blocks each having opposite generally vertical faces, means uniting one of said generally vertical faces of each of said rubber blocks to the said generally vertical face of the corresponding frame bracket, a first pair of generally vertical plates arranged generally parallel with said axle, means uniting the corresponding faces of said first pair of plates with the corresponding faces of said first pair of rubber blocks opposite their said generally vertical faces, a second pair of generally vertical plates arranged generally at right angles to said axle, means arranged to connect said first and second pairs of generally vertical plates, a second pair of rubber blocks each having opposing generally vertical faces, means uniting one of said generally vertical faces of each of said second pair of rubber blocks to the said corresponding face of said second pair of generally vertical plates, means connecting the face of each of said second pair of rubber blocks opposite said opposing generally vertical faces thereof with said axle, comprising an inverted U-shaped axle bracket having an upper connecting portion and depending legs straddling said second pair of rubber blocks, means arranged to secure said legs to said axle, and means arranged to secure said legs to said faces of said second pair of rubber blocks opposite said opposing generally vertical faces thereof, and means yieldingly restraining said axle against horizontal movement generally at right angles to said axle, comprising an upper link extending lengthwise of the direction of movement of said frame, pivotal connections between the opposite ends of said upper link and said frame and said upper connecting portion of said axle bracket, respectively, a lower link below and parallel with said upper link, and pivotal connections between the opposite ends of said lower link and said axle and frame, respectively, at least one of said pivotal connections of each of said links including a rubber body.

13. A vehicle spring suspension adapted to be interposed between the frame structure and an axle structure having a wheel journalled coaxially thereon, comprising a rubber body having opposite generally vertical faces arranged generally at right angles to said axle structure to be capable of vertical flexure and horizontal flexure generally at right angles to said axle structure, said rubber body being disposed between said frame and the plane of said wheel, means securing one of said faces to said frame structure, means securing the other of said faces to said axle structure, and at least one generally horizontal radius rod extending generally at right angles to said axle structure, and means pivotally connecting said radius rod to said axle structure and to said frame structure, whereby said radius rod connects said axle structure with said frame structure to restrain horizontal movement of said axle structure at right angles to its axis.

14. A vehicle spring suspension adapted to be interposed between the frame of a highway vehicle and an axle having a wheel journalled coaxially on each end of said axle, comprising a pair of substantially identical rubber blocks at each end of said axle intermediate said frame and the corresponding wheel, each rubber block having opposite generally vertical faces and each pair of said rubber blocks being arranged with two of said vertical faces in opposing relation to each other, means uniting said opposing generally vertical faces of each pair of said rubber blocks to the corresponding end of said axle intermediate said frame and the plane of the corresponding wheel, means uniting the other of said generally vertical faces of each pair of said rubber blocks to said frame, and at least one generally horizontal radius rod extending generally at right angles to said axle, a universal joint connecting said radius rod to said axle and a universal joint connecting said radius rod to said frame, whereby said radius rod connects said axle to said frame to restrain horizontal movement of said axle at right angles to its axis and to resist brake and drive torque reactions of said axle.

15. A vehicle spring suspension adapted to be interposed between the frame of a highway vehicle and an axle having a wheel journalled coaxially on each end of said axle, comprising a pair of substantially identical rubber blocks at each end of said axle intermediate said frame and the corresponding wheel, each rubber block having opposite generally vertical faces and each pair of said rubber blocks being arranged with two of said vertical faces in opposing relation to each other, means uniting said opposing generally vertical faces of each pair of said rubber blocks to the corresponding end of said axle intermediate said frame and the plane of the corresponding wheel, means uniting the other of said generally vertical faces of each pair of said rubber blocks to said frame, and a pair of generally horizontal radius rods of substantially equal effective length arranged one above the other in the form of a parallelogram and to extend generally at right angles to said axle, a universal joint connecting each of said radius rods to said axle and a universal joint connecting said radius rod to said frame, whereby said radius rods connect said axle to said frame to restrain horizontal movement of said axle at right angles to its axis and to resist brake and drive torque reactions of said axle.

References Cited in the file of this patent

UNITED STATES PATENTS

| | | |
|---|---|---|
| 2,019,052 | Lord | Oct. 29, 1935 |
| 2,063,758 | Schjolin | Dec. 8, 1936 |
| 2,211,463 | Hobson | Aug. 13, 1940 |
| 2,212,769 | Boxan | Aug. 27, 1940 |
| 2,216,715 | Ledwinka | Oct. 1, 1940 |
| 2,233,540 | Latshaw | Mar. 4, 1941 |
| 2,286,563 | Mussey | June 16, 1942 |
| 2,605,098 | Hendrickson | July 29, 1952 |

FOREIGN PATENTS

| | | |
|---|---|---|
| 352,467 | Italy | Sept. 15, 1937 |
| 487,468 | Great Britain | June 21, 1938 |
| 488,888 | Great Britain | July 15, 1938 |
| 613,179 | Great Britain | Nov. 23, 1948 |